(12) United States Patent
Zhu

(10) Patent No.: US 12,061,105 B2
(45) Date of Patent: Aug. 13, 2024

(54) METHOD FOR OPERATING A FLOW MEASURING POINT FOR MEDIA HAVING AT LEAST ONE LIQUID PHASE

(71) Applicant: Endress+Hauser Flowtec AG, Reinach (CH)

(72) Inventor: Hao Zhu, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 252 days.

(21) Appl. No.: 17/757,219

(22) PCT Filed: Nov. 20, 2020

(86) PCT No.: PCT/EP2020/082924
§ 371 (c)(1),
(2) Date: Jun. 10, 2022

(87) PCT Pub. No.: WO2021/121868
PCT Pub. Date: Jun. 24, 2021

(65) Prior Publication Data
US 2023/0022150 A1   Jan. 26, 2023

(30) Foreign Application Priority Data

Dec. 16, 2019   (DE) .......................... 102019134602.9

(51) Int. Cl.
*G01F 1/84*   (2006.01)
*G01F 1/50*   (2006.01)
(Continued)

(52) U.S. Cl.
CPC .............. *G01F 1/8436* (2013.01); *G01F 1/50* (2013.01); *G01N 9/32* (2013.01); *G01N 11/08* (2013.01)

(58) Field of Classification Search
CPC . G01F 1/8436; G01F 1/50; G01F 1/34; G01F 1/74; G01N 9/32; G01N 11/08
See application file for complete search history.

(56) References Cited

U.S. PATENT DOCUMENTS 5,359,881 A * 11/1994 Kalotay ................ G01F 1/8436
73/54.09
9,605,987 B2   3/2017 Wee et al.
(Continued)

FOREIGN PATENT DOCUMENTS

DE   102005046319 A1   3/2007
DE   102010000759 A1   7/2011
(Continued)

OTHER PUBLICATIONS

Zhu, Hao, Application of Coriolis Mass Flowmeters in Bubbly and Particulate Two-Phase Flows, Shaker Verlag Gmbh, ISBN 978-3-8322-8216-5, 2009, Aachen, Germany.

*Primary Examiner* — Peter J Macchiarolo
*Assistant Examiner* — Anthony W Megna Fuentes
(74) *Attorney, Agent, or Firm* — Christopher R. Powers; Endress+Hauser (USA) Holding, Inc.

(57) ABSTRACT

The present disclosure relates to a method for operating a flow measuring point for media having at least one liquid phase, the flow measuring point including: a Coriolis measuring device for measuring the mass flow rate and the density of a medium flowing through a pipeline; and a pressure-difference measuring apparatus for sensing the pressure difference between a flow region arranged upstream of the Coriolis measuring device and a flow region arranged downstream of the Coriolis measuring device, wherein a flow measurement based on measured values of the pressure difference is corrected by means of measured values acquired using the Coriolis measuring device.

14 Claims, 3 Drawing Sheets

(51) Int. Cl.
  *G01N 9/32*    (2006.01)
  *G01N 11/08*    (2006.01)
  *G01F 1/34*    (2006.01)
  *G01F 1/74*    (2006.01)

(56) References Cited

U.S. PATENT DOCUMENTS

2007/0084298 A1*  4/2007  Rieder ................. G01F 1/8404
                                                          73/861.356
2008/0184813 A1*  8/2008  Patten ................... G01F 1/8413
                                                          73/861.355
2018/0003538 A1*  1/2018  Schollenberger ..... G01F 1/8431

FOREIGN PATENT DOCUMENTS

DE    102010000760  A1    7/2011
GB        2572836  A    10/2019
WO        0036379  A1    6/2000

* cited by examiner

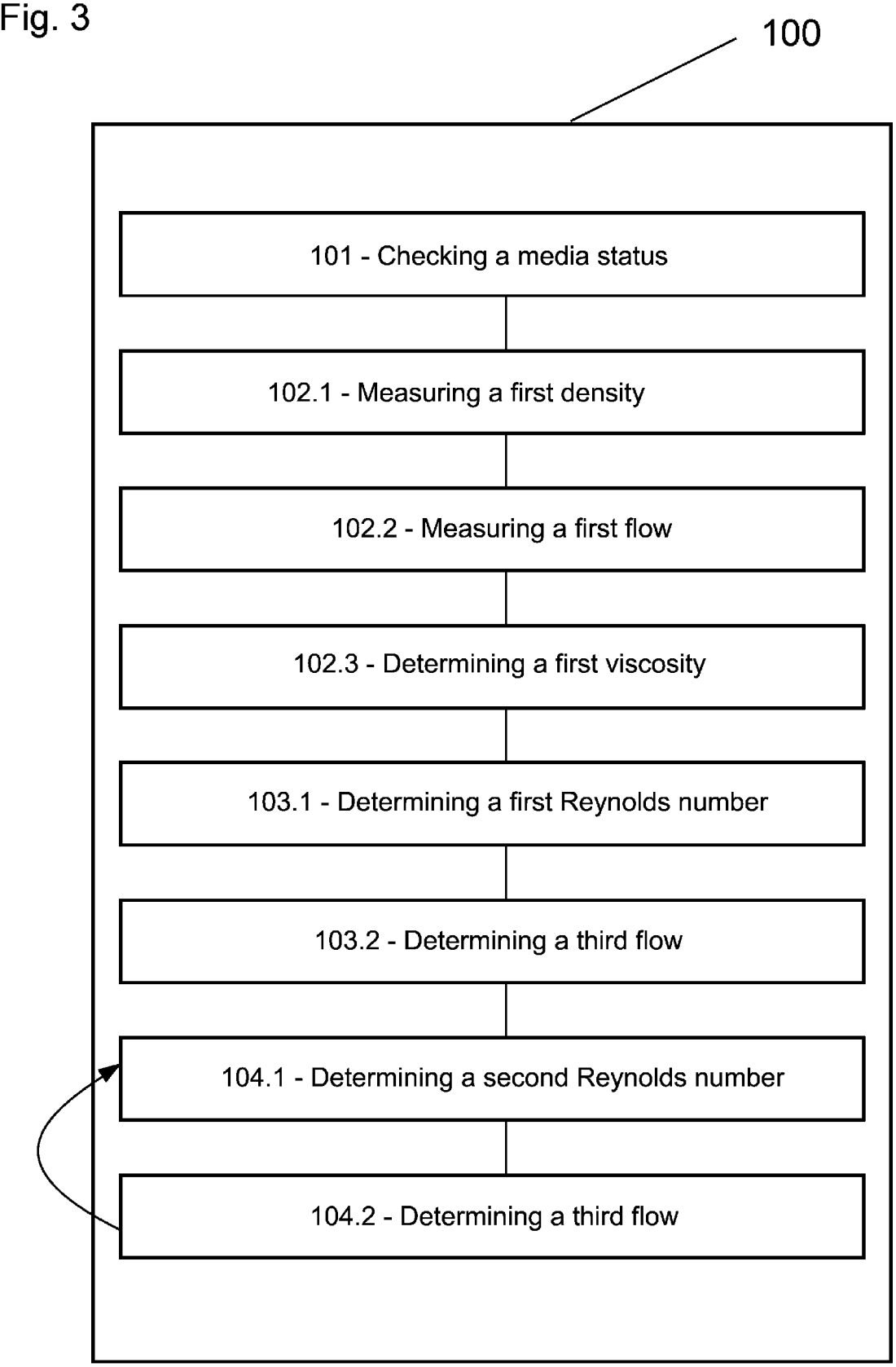

METHOD FOR OPERATING A FLOW MEASURING POINT FOR MEDIA HAVING AT LEAST ONE LIQUID PHASE

CROSS-REFERENCE TO RELATED APPLICATIONS

The present application is related to and claims the priority benefit of German Patent Application No. 102019134602.9, filed on Dec. 16, 2019, and International Patent Application No. PCT/EP2020/082924, filed Nov. 20, 2020, the entire contents of which are incorporated herein by reference.

TECHNICAL FIELD

The invention relates to a method for operating a flow measuring point comprising a Coriolis measuring device and a pressure-difference measuring apparatus.

BACKGROUND

Coriolis measuring devices for measuring a flow or a density of a liquid medium flowing through a pipeline have under certain conditions such as, for example, very low flow rates or gas bubbles in the medium, a decreasing measurement accuracy with regard to flow measurement. It has proven advantageous in such situations to detect by means of a pressure-difference measuring apparatus a pressure drop of the medium across the Coriolis measuring device and to use measured values of the pressure difference for a flow measurement; see, for example, DE102005046319A1. In applications in which a composition of the medium fluctuates in a relatively short time, a flow measurement by means of pressure difference measurement is, however, also subject to disruptive uncertainties.

SUMMARY

It can therefore be seen as an aim of the invention to enable or to improve a flow measurement under difficult conditions.

The aim is achieved by a method according to the present disclosure.

In a method according to the invention for operating a flow measuring point for media having at least one liquid phase, comprising:
a Coriolis measuring device for measuring a mass flow rate and a density of a medium flowing through a pipeline, wherein the Coriolis measuring device has at least one measurement tube, in each case having an inlet and an outlet;
wherein a pressure-difference measuring apparatus is configured to detect a pressure difference between a flow region arranged upstream of a flow obstruction, especially the Coriolis measuring device, and a flow region arranged downstream of the flow obstruction,
the method has the following steps:
checking a media state by means of the Coriolis measuring device;
upon detection of a purely liquid medium,
measuring a first density of the medium by means of the Coriolis measuring device and storing a measured value of the first density,
measuring a first mass flow rate by means of the Coriolis measuring device,
determining a first viscosity of the medium on the basis of the first density, the pressure difference, and the first mass flow rate, and storing a measured value of the first viscosity;
upon detection of a gaseous fraction in the medium,
determining a first Reynolds number of the medium by means of
the first viscosity,
the first density and/or a second density of the medium measured by means of the Coriolis measuring device when the gaseous fraction is detected,
a second mass flow rate measured by means of the Coriolis measuring device when the gaseous fraction is detected,
determining a third mass flow rate on the basis of the pressure difference and the first Reynolds number.

In this way, a mass flow rate measurement can be corrected based upon a pressure difference measurement, so that sufficiently accurate measured values are obtained even under difficult conditions.

For example, the state of the medium can fluctuate quickly when crude oil is being extracted from an oil field. Gases dissolved under high pressure in the medium can form gas bubbles during pressure reduction and thus influence variables such as density or viscosity of the medium.

For the start of the method, a person skilled in the art can specify, for example, initial values for measured values of the first density and the first viscosity when a gaseous medium is initially present, which initial values he obtains, for example, by estimating or by experience or by a physical calculation. He can also cause the flow measuring point to wait at the start of the method until a purely liquid medium is present for the first time.

When determining the first Reynolds number by means of the first viscosity, the first density, the second density, or the second mass flow rate, corresponding measured values are used. The same applies for the determination of other measured variables.

In one embodiment, the following iterative method steps are carried out when the gaseous fraction is detected:
determining a second Reynolds number by means of
the third mass flow rate,
the first viscosity,
the first density and/or the second density;
storing a measured value of the second Reynolds number;
determining a third mass flow rate on the basis of the pressure difference and the second Reynolds number; and
storing a measured value of the third mass flow rate.

This iteration can further increase measurement accuracy.

In one embodiment, the iteration is terminated as soon as an amount of a difference of successive measured values of the third mass flow rate or the second Reynolds number falls below a limit value,
wherein the limit value is, for example, 5%, and especially 2% and preferably 1%, of a mean value of the measured values forming the difference or of one of the measured values forming the difference.

In one embodiment, the media state is checked by means of the Coriolis measuring device, wherein a damping of vibrations and/or a fluctuation of a resonance frequency of at least one measurement tube of the Coriolis measuring device is used during the check.

In one embodiment, a resonance frequency of at least one measurement tube of the Coriolis measuring device is used when the density is measured.

In one embodiment, the density measurement is corrected using a physical-mathematical model when a gaseous fraction is detected, wherein the model takes into account an influence of gas bubbles on the measurement of the media density.

In the measurement tube of the Coriolis measuring device, the gas bubbles in the medium, depending upon, among other things, a gas bubble diameter, carry out a movement perpendicular to a measurement tube inner wall in the direction parallel to the measurement tube movement, and thereby influence measured values in terms of density and viscosity. The model takes into account the relative movement; thus, the disruptive influence of the gas bubbles can be corrected. A person skilled in the art finds more on this, for example, in H. Zhu, Application of Coriolis Mass Flowmeters in Bubbly and Particulate Two-Phase Flows, Shaker, ISBN 978-3-8322-8216-5, 2009.

In one embodiment, a second density of the medium is measured by means of the Coriolis measuring device when a gaseous fraction is detected, wherein a ratio of a volume of the gaseous fraction to liquid fraction is determined on the basis of the first density and the second density, wherein a measured value of a pressure difference measurement is corrected by means of the ratio.

A mass flow rate can then be determined correctly by means of this correction.

In one embodiment, the pressure-difference measuring apparatus has a first pressure sensor and a second pressure sensor, wherein the first pressure sensor is arranged upstream of the flow obstruction, and wherein the second pressure sensor is arranged downstream of the flow obstruction, and/or wherein the pressure-difference measuring apparatus has a differential pressure sensor which detects a pressure difference of an upstream-directed side of the flow obstruction and of a downstream-directed side of the flow obstruction.

The pressure-difference measuring apparatus can be part of the flowmeter or be a stand-alone measuring device which transmits measured values of the pressure difference to the flowmeter.

In one embodiment, an electronic measurement/control circuit of the Coriolis measuring device provides measured values of the mass flow rate and outputs them, wherein measured values, detected by means of the Coriolis measuring device, of the first mass flow rate are output when a purely liquid medium is detected, and wherein measured values, detected by means of the pressure difference, of the third mass flow rate are output when a gaseous fraction is detected in the medium.

In one embodiment, an influence of a static pressure difference on measured values of the pressure difference is corrected.

In one embodiment, if an absolute value of the pressure difference falls below a limit value, a mass flow rate determined by means of the pressure difference is set to a value of zero, wherein the limit value is, for example, 20 mbar, and especially 10 mbar and preferably 5 mbar.

The invention will now be described with reference to exemplary embodiments.

BRIEF DESCRIPTION OF THE DRAWINGS

FIG. 3 shows the sequence of a method according to the according to the present disclosure.

DETAILED DESCRIPTION

Figure 1:
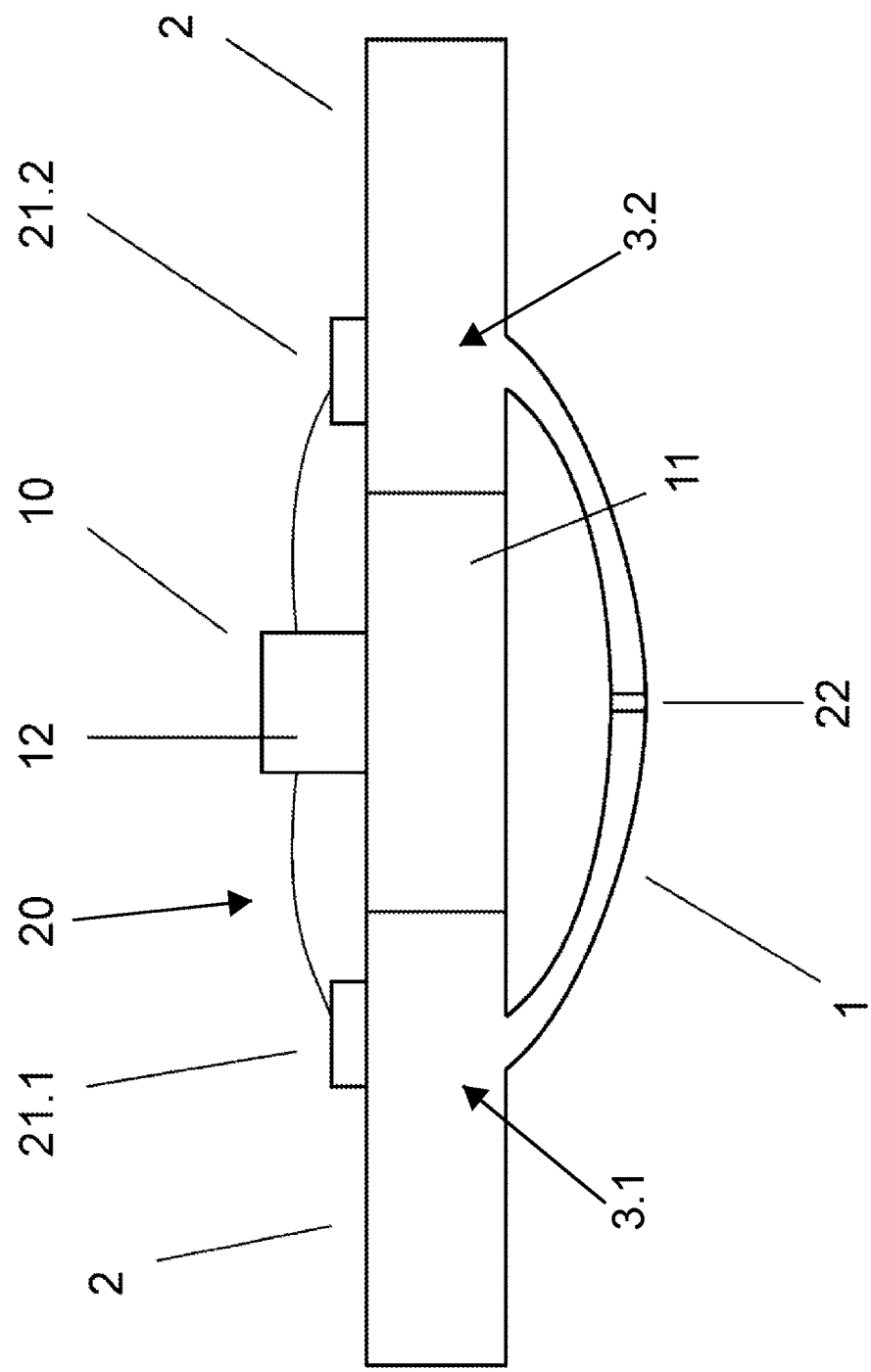
FIG. 1 shows an exemplary flow measuring point having a Coriolis measuring device and a pressure-difference measuring apparatus according to the present disclosure.

FIG. 1 illustrates an exemplary flow measuring point 1 comprising a media-conducting pipeline 2 and a Coriolis measuring device 10, arranged in the pipeline 2, for detecting a mass flow rate and a density of the medium flowing through the pipeline 2. Furthermore, the flow measuring point 1 has a pressure-difference measuring apparatus 20, which is configured to detect a pressure difference between a flow region 3.1 arranged upstream of the Coriolis measuring device 10 and a flow region 3.2 arranged downstream of the Coriolis measuring device 10. Alternatively, a pressure difference can also be measured across another flow obstruction.

As shown here, the pressure-difference measuring apparatus can have a first pressure sensor 21.1 upstream of the Coriolis measuring device and a second pressure sensor 21.2 downstream of the Coriolis measuring device. A difference between measured values of the pressure sensors is used as a measure of a pressure difference across the Coriolis measuring device. Alternatively or additionally, the pressure-difference measuring apparatus can, as shown here, have a differential pressure sensor 22, which is inserted into a bypass channel and separates it in a sealed manner into a first section and a second section; a pressure difference can be detected, for example, by a deflection of a membrane of the differential pressure sensor 22.

Figure 2:
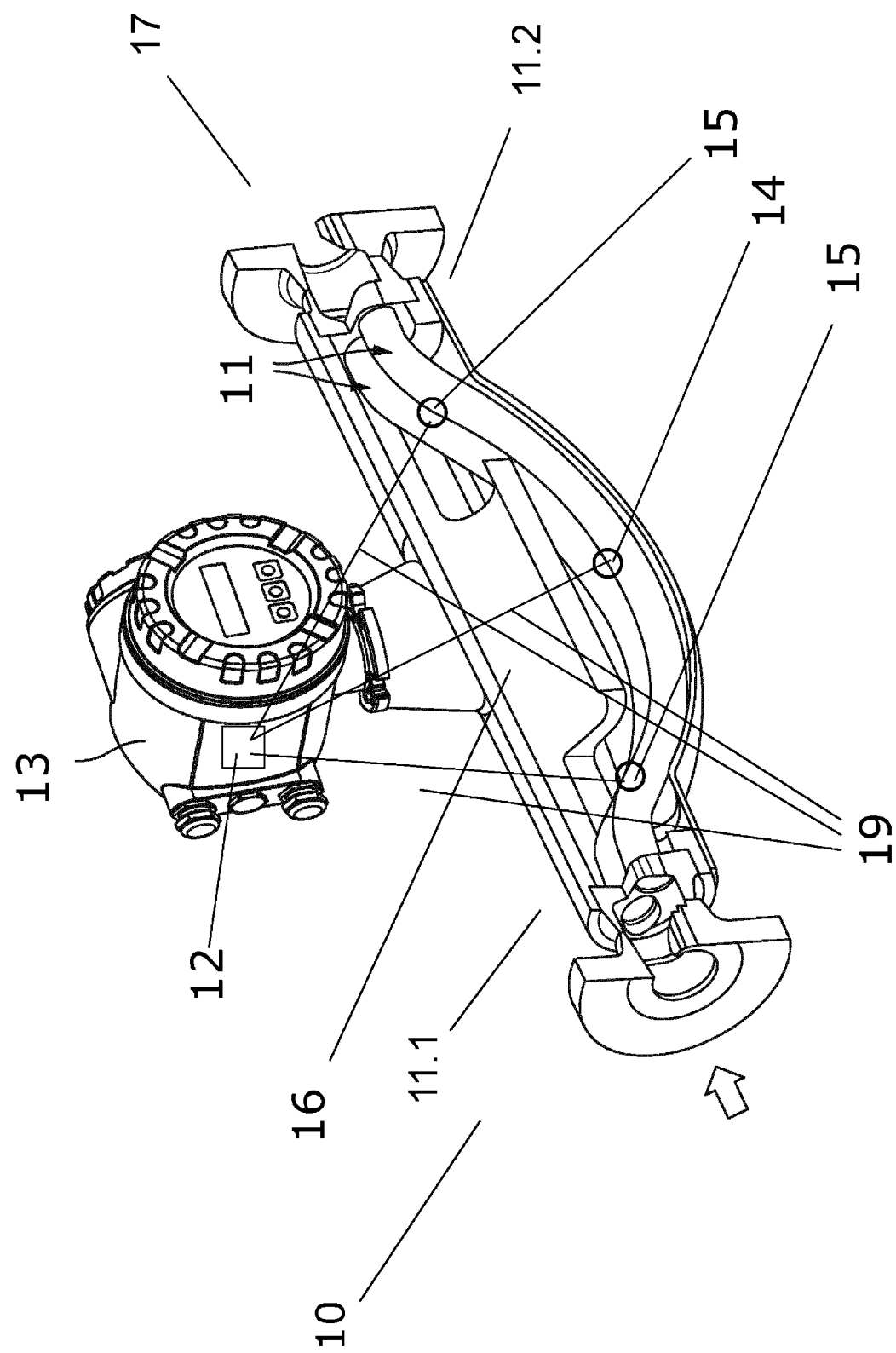
FIG. 2 shows an exemplary Coriolis measuring device.

The pressure-difference measuring apparatus can be part of the Coriolis measuring device, as shown here, wherein measurement signals of the pressure sensors or of the differential pressure sensor are transmitted to an electronic measurement/control circuit of the Coriolis measuring device 10; see also FIG. 2. The measurement signals are then processed by the electronic measurement/control circuit, which generates and provides measured values based thereon of the pressure difference. Alternatively, the pressure-difference measuring apparatus can also be a separate measuring device and can be configured to transmit measured values for the pressure difference to the Coriolis measuring device.

FIG. 2 shows a Coriolis measuring device 10 having a measuring transducer 17, an electronic measurement/control circuit 12, and a housing 13 for housing the electronic measurement/control circuit 12.

The measuring transducer 17 has two measurement tubes 11, each having an inlet 11.1 and an outlet 11.2, which are held by a supporting element 16. The measurement tubes 11 are configured to vibrate against one another. The measurement tube quantity shown in FIG. 2 is an example; the measuring transducer 17 may have, for example, only one measurement tube or four measurement tubes, which are arranged especially in two measurement tube pairs, wherein the measurement tubes of a pair are configured to vibrate against one another. The measuring transducer 17 has an exciter 14, which is configured to excite vibration of the measurement tubes. The measuring transducer 17 has two sensors 15, which are configured to detect the measurement tube vibrations. A medium flowing through the measurement tubes influences the measurement tube vibrations in a characteristic manner, so that a mass flow rate and/or a density of the medium and/or a viscosity of the medium can be derived from the measurement signals of the sensors.

Coriolis measuring devices work very well in purely liquid media, which optionally carry several different components, such as an oil-water mixture, for example. In special applications, such as when crude oil is from extracted from an oil field, the medium can, among other things, carry a gaseous fraction in the form of gas bubbles, which greatly complicates flow measurement by means of the Coriolis measuring device. It is known from the prior art to use, in such cases, a pressure difference which drops across the Coriolis measuring device as a measure for a mass flow rate. In this case, a density or a viscosity of the medium is determined by means of the Coriolis measuring device when a purely liquid medium is present, and a flow parameter is determined by means of the pressure difference and the density or the viscosity when a gaseous fraction is present.

However, a determination of the density or the viscosity is often insufficiently accurate when a gaseous fraction is present.

FIG. 3 therefore describes an exemplary method according to the invention by means of which a high measurement accuracy can be achieved at a flow measuring point, even when a gaseous fraction is present in the medium.

The method has the following steps:
checking a media state by means of the Coriolis measuring device in a first method step 101;
upon detection of a purely liquid medium,
measuring a first density of the medium by means of the Coriolis measuring device and storing a measured value of the first density in a subsequent method step 102.1;
measuring a first mass flow rate by means of the Coriolis measuring device in a subsequent method step 102.2;
determining a first viscosity of the medium on the basis of the first density, the pressure difference, and the first mass flow rate; and storing a measured value of the first viscosity 102.3 in a subsequent method step;
upon detection of a gaseous fraction in the medium,
determining a first Reynolds number of the medium in a subsequent method step 103.1 by means of
the first viscosity,
the first density and/or a second density of the medium measured by means of the Coriolis measuring device when the gaseous fraction is detected,
a second mass flow rate measured by means of the Coriolis measuring device when the gaseous fraction is detected;
and determining a third mass flow rate on the basis of the pressure difference and the first Reynolds number in a subsequent method step 103.2.

If a gaseous fraction is present in the medium, an actual mass flow rate can be better estimated by determining the third mass flow rate by means of the first Reynolds number and the pressure difference, The Reynolds number of the medium acts upon a flow profile of the medium in the measurement tube of the Coriolis measuring device. A gaseous fraction in the form of gas bubbles acts upon the Reynolds number and thus upon the flow profile and must therefore be taken into account when the third mass flow rate is determined. A relationship between the Reynolds number Re, flow rate v, density of the medium ρ, and first viscosity η (a dynamic viscosity) values is given by:

$$Re = \frac{\rho * v * d}{\eta}$$

with d as the diameter of the measurement tube.

It is of great advantage here if the first viscosity is determined, not by means of the Coriolis measuring device, but, in accordance with the invention, by means of the pressure difference. Even a very small gaseous fraction in the form of small gas bubbles can lead to a significant influence on a viscosity measurement by a Coriolis measuring device, without the presence of the very low gaseous fraction being detected. In this case, a mass flow rate measurement by means of pressure difference would be severely distorted.

For example, when checking the media state by means of the Coriolis measuring device, a damping of vibrations and/or a fluctuation of a resonance frequency of at least one measurement tube 11 of the Coriolis measuring device is used. For example, a limit value of a viscosity measured by vibration damping can be used to distinguish between purely liquid medium and medium with gas bubbles. A viscosity of a liquid usually has a value within a certain value range. In the case of measured values outside the value range, a presence of gas bubbles can therefore be detected.

For the purpose of improving the measurement accuracy of the mass flow rate, the following iterative method steps can be carried out when a gaseous fraction is detected:
determining a second Reynolds number 104.1 by means of
the third mass flow rate;
the first viscosity;
the first density and/or the second density,
and storing a measured value of the second Reynolds number, determining a third mass flow rate 104.2 on the basis of the pressure difference and the second Reynolds number, and storing a measured value of the third mass flow rate.

Repeating the two method steps leads to convergence of iteration values of the third mass flow rate.

The iteration can be terminated, for example, as soon as an amount of a difference of successive measured values of the third mass flow rate or the second Reynolds number falls below a limit value, wherein the limit value is, for example, 5%, and especially 2% and preferably 1%, of a mean value of the measured values forming the difference or of one of the measured values forming the difference,
or the iteration can be terminated, for example, when a maximum time period has elapsed, wherein the maximum time period is delimited, for example, by a time interval between two measured values of the mass flow rate.

To improve the measurement accuracy, an influence of a static pressure difference on measured values of the pressure difference can be corrected. When an installation situation of the Coriolis measuring device and of the pressure difference measuring apparatus in the pipeline is known, especially when an inclination with respect to a horizontal line is known, a static pressure difference can be calculated by means of media density and, for example, a distance of the pressure sensors, and can be taken into account when the measured values of the third mass flow rate are determined.

If an absolute value of the pressure difference, optionally corrected by the static pressure difference, falls below a limit value, a mass flow rate determined by means of the pressure difference can be set to a value of zero, wherein the limit value is, for example, 20 mbar, and especially 10 mbar and preferably 5 mbar. In this way, it can be avoided that a fixed pressure difference on the order of magnitude of a measurement uncertainty is evaluated as a mass flow rate.

The electronic measurement/control circuit 12 of the Coriolis measuring device thereby provides measured values of the mass flow rate and outputs them, wherein measured values, detected by means of the Coriolis measuring device, of the first mass flow rate are output when a purely liquid medium is detected, and wherein measured values, detected by means of the pressure difference, of the third mass flow rate are output when a gaseous fraction is detected in the medium.

The invention claimed is:

1. A method for operating a flow measuring point for media having at least one liquid phase, the flow measuring point comprising:
   a Coriolis measuring device configured to measure a mass flow rate and a density of a medium flowing through a pipeline, wherein the Coriolis measuring device has at least one measurement tube that includes an inlet and an outlet; and
   a pressure-difference measuring apparatus configured to detect a pressure difference between a first flow region disposed upstream of a flow obstruction and a second flow region disposed downstream of the flow obstruction,
   the method comprising:
   detecting a media state of the medium, in which the medium is entirely liquid, using the Coriolis measuring device so as to:
      measure a first density of the medium using the Coriolis measuring device;
      store a measured value of the first density;
      measure a first mass flow rate using the Coriolis measuring device;
      determine a first viscosity of the medium based on the first density, the pressure difference and the first mass flow rate; and
      store a measured value of the first viscosity; and
   subsequently detecting the media state in which the medium includes a gaseous fraction so as to:
      determine a first Reynolds number of the medium using:
         the first viscosity;
         the first density and/or a second density of the medium measured by the Coriolis measuring device when the gaseous fraction is detected; and
         a second mass flow rate measured by the Coriolis measuring device when the gaseous fraction is detected; and
      determine an initial third mass flow rate based on the pressure difference and the first Reynolds number.

2. The method of claim 1, further comprising iteratively preforming the following steps when the gaseous fraction is detected:
   determining a second Reynolds number using:
      the initial third mass flow rate;
      the first viscosity; and
      the first density and/or the second density;
   storing a measured value of the second Reynolds number;
   determining a subsequent third mass flow rate based on the pressure difference and the second Reynolds number; and
   storing a measured value of the subsequent third mass flow rate.

3. The method of claim 2, further comprising terminating the iteratively performed steps when a magnitude of a difference of successive measured values of the subsequent third mass flow rate or the second Reynolds number falls below a limit value,
   wherein the limit value is less than or equal to 5% of a mean value of the measured values defining the difference or of one of the measured values defining the difference.

4. The method of claim 3, wherein the limit value is 1% of the mean value of the measured values defining the difference or of one of the measured values defining the difference.

5. The method of claim 1, wherein a damping of vibrations and/or a fluctuation of a resonance frequency of the at least one measurement tube of the Coriolis measuring device is used to detect the media state of the medium.

6. The method of claim 1, wherein a resonance frequency of the at least one measurement tube of the Coriolis measuring device is used to measure the first density and/or the second density.

7. The method of claim 6, further comprising correcting the measured second density based on a physical-mathematical model when the gaseous fraction is detected,
   wherein a tube wall defines the at least one measurement tube, and
   wherein the model accounts for a movement of gas bubbles relative to the measurement tube wall in a measurement tube vibration direction.

8. The method of claim 1, wherein the second density of the medium is measured using the Coriolis measuring device when a gaseous fraction is detected,
   wherein a ratio of a volume of the gaseous fraction to a liquid fraction of the medium is determined based on the first density and the second density, and
   wherein a measured value of a pressure difference measurement is corrected using the ratio.

9. The method of claim 1, wherein the pressure-difference measuring apparatus comprises a first pressure sensor and a second pressure sensor, the first pressure sensor disposed upstream of the flow obstruction, and the second pressure sensor disposed downstream of the flow obstruction, and/or
   wherein the pressure-difference measuring apparatus comprises a differential pressure sensor, which is configured to detect a pressure difference of an upstream-directed side of the flow obstruction and a downstream-directed side of the flow obstruction.

10. The method of claim 1, wherein the Coriolis measuring device comprises an electronic measurement/control circuit configured to determine and output measured values of the first, second and third mass flow rates,
    wherein the measured values of the first mass flow rate are output when a purely liquid medium is detected,
    wherein the measured values, detected using the pressure difference, of the third mass flow rate are output when the media state including the gaseous fraction is detected, and
    wherein the electronic measurement/control circuit is disposed in a housing of the Coriolis measuring device.

11. The method of claim 1, wherein an influence of a static pressure difference on measured values of the pressure difference is corrected.

12. The method of claim 1, wherein, when an absolute value of the pressure difference is below a limit value, the initial third mass flow rate or a subsequent third mass flow rate determined using the pressure difference is set to a value of zero, wherein the limit value is less than or equal to 20 mbar.

13. The method of claim 12, wherein the limit value is 5 mbar.

14. The method of claim 1, wherein the flow obstruction is the Coriolis measuring device.

* * * * *